United States Patent
Chou et al.

(10) Patent No.: US 9,869,042 B2
(45) Date of Patent: Jan. 16, 2018

(54) SPUNBOND METHOD FOR PRODUCING NON-WOVEN FABRIC OF NATURAL CELLULOSE WITH FLAME-RETARDING FEATURE

(71) Applicant: Acelon Chemicals and Fiber Corporation, Changhua County (TW)

(72) Inventors: Wen-Tung Chou, Changhua County (TW); Ming-Yi Lai, Changhua County (TW); Kun-Shan Huang, Tainan (TW)

(73) Assignee: ACELON CHEMICALS AND FIBER CORPORATION, Changhua County (TW)

( * ) Notice: Subject to any disclaimer, the term of this patent is extended or adjusted under 35 U.S.C. 154(b) by 178 days.

(21) Appl. No.: 14/663,762

(22) Filed: Mar. 20, 2015

(65) Prior Publication Data

US 2016/0168772 A1    Jun. 16, 2016

(30) Foreign Application Priority Data

Dec. 12, 2014 (TW) .............................. 103143459 A (51) Int. Cl.
*D01D 1/02* (2006.01)
*D01D 5/06* (2006.01)
(Continued)

(52) U.S. Cl.
CPC ........... *D04H 3/013* (2013.01); *D01D 5/0985* (2013.01); *D01F 2/00* (2013.01); *D01F 13/02* (2013.01);
(Continued)

(58) Field of Classification Search
CPC .. D01D 1/02; D01D 5/06; D01D 5/12; D01D 5/14; D01D 5/16; D01D 7/00;
(Continued)

(56) References Cited

U.S. PATENT DOCUMENTS 4,257,221 A    3/1981 Feinberg
4,466,990 A    8/1984 Sakurada et al.
(Continued)

FOREIGN PATENT DOCUMENTS

CN    103290682 A  *  9/2013 ............... D01F 2/00

OTHER PUBLICATIONS

Machine translation of CN 103290682 A (published on Sep. 11, 2013.*

*Primary Examiner* — Leo B Tentoni
(74) *Attorney, Agent, or Firm* — Bacon & Thomas, PLLC (57) ABSTRACT

A spunbond method for producing non-woven fabric of natural cellulose with flame-retarding feature comprises following steps. Blend pulp and solvent of N-methylmorpholine N-oxide (NMMO) to form slurry. Evaporate water content from slurry by a Thin Film Evaporator to form dope. Extrude the dope off spin nozzles to form filament strand via spunbond method. Coagulating regenerate, water rinse, hydro-entangled needle-punch and dry the filament strand to form normal natural cellulose nonwoven, which is soaking rolled by flame retardant of N-hydroxymethyl-3-(dimethoxy-phosphate acyl) propyl amide, then orderly bake, alkaline clean, water rinse, dry and wind-up to convert it into modified natural cellulose nonwoven fabrics of long-acting flame retarding feature in coil manner. Because of crosslinking reaction between foregoing flame retardant and natural cellulose nonwoven, the flame-retarding capability thereof meet requirements of testing standards in American ASTM D6413-1999 and ASTM D2863-1995. Moreover, the wastes thereof meet environmental protection requirements.

10 Claims, 4 Drawing Sheets

(51) Int. Cl.

| | | |
|---|---|---|
| *D01D 5/12* | (2006.01) | |
| *D01D 5/14* | (2006.01) | |
| *D01D 5/16* | (2006.01) | |
| *D01D 7/00* | (2006.01) | |
| *D01D 10/00* | (2006.01) | |
| *D01D 10/06* | (2006.01) | |
| *D01F 2/02* | (2006.01) | |
| *D04H 3/013* | (2012.01) | |
| *D06M 13/292* | (2006.01) | |
| *D01D 5/098* | (2006.01) | |
| *D01F 2/00* | (2006.01) | |
| *D01F 13/02* | (2006.01) | |
| *D04H 3/105* | (2012.01) | |
| *D04H 3/11* | (2012.01) | |
| *D06M 101/06* | (2006.01) | |

(52) U.S. Cl.
CPC ............... *D04H 3/105* (2013.01); *D04H 3/11* (2013.01); *D06M 13/292* (2013.01); *D06M 2101/06* (2013.01); *D06M 2200/30* (2013.01); *Y02P 70/627* (2015.11)

(58) Field of Classification Search
CPC .......... D01D 10/00; D01D 10/06; D01F 2/02; D01F 13/02; D04H 3/013; D04H 3/105; D04H 3/11; D06M 13/292; D06M 2101/06; D06M 2200/30
USPC ........ 264/37.18, 37.2, 37.24, 103, 187, 203, 264/210.8, 211.12, 211.14, 211.15, 232, 264/233, 234; 28/104, 107
See application file for complete search history.

(56) References Cited

U.S. PATENT DOCUMENTS

| | | |
|---|---|---|
| 8,127,575 B2 | 3/2012 | Burrow et al. |
| 2002/0060382 A1* | 5/2002 | Luo .......................... D01D 1/02 264/187 X |
| 2011/0156303 A1* | 6/2011 | Chou ....................... D01D 5/06 264/183 |

* cited by examiner

SPUNBOND METHOD FOR PRODUCING NON-WOVEN FABRIC OF NATURAL CELLULOSE WITH FLAME-RETARDING FEATURE

FIELD OF THE PRESENT INVENTION

The present invention relates to a spunbond method for producing non-woven fabric of natural cellulose with flame-retarding feature, which belongs to technical field of eco-friendly fossil-free fiber process. The process comprises: blend and dissolve wood pulp by solvent of N-methylmorpholine N-oxide (NMMO) to form into slurry; evaporate slurry to form a spinning dope; spin and extrude dope out of spinnerets to form spinning filaments via spunbond process, and coagulation with regeneration, water-rinse and dry the spinning filaments to form normal natural cellulose nonwoven; soak and roll the filaments with flame retardant of N-hydroxymethyl-3-(dimethoxy-phosphate acyl) propyl amide via cross-linking reaction, then orderly bake, alkaline clean, water rinse, dry and coil the nonwoven to produce modified natural cellulose nonwoven of long-acting flame retarding feature.

BACKGROUND OF THE INVENTION

Currently, spunlaid process (also known as polymer laid process) already became a most fast growing technology in the technical field of nonwoven manufacturing process because of advantages of simple process with high economical effect. The spunlaid nonwoven are produced from melted macromolecule polymers through extruding and stretching melted polymers to form continuous filaments as well as stacking laying for web formation so that the nonwoven fabrics of such filaments feature in good physical properties of air permeability and water absorption. Thus, such nonwoven fabrics are prevalently used in application fields of medical, sanitary, wiper, filters and so on. Wherein, main raw materials of spunlaid process are from polypropylene (PP), polyester (PET), polyethylene (PE) and Nylon in quantity order with overall consumed quantity 96% of global total consumption. According to the survey and statistics of Association of the Nonwoven Fabrics Industry USA, which used to be International Nonwovens & Disposables Association (INDA), the marketing share for the spunlaid nonwoven already from 33.5% in 1994 (second position) leaps up to 43.7% in 2009 (first position) with total annual yield of 2.7 million tons. However, the wasted spunlaid nonwoven after having been used incurs a malignant impact to natural environment because they are indissoluble or un-biodegradable by natural environment.

Accordingly, most countries stipulated relevant technical regulations about flammability for textile products in succession so that importing and marketing of such textile products against these technical regulations is prohibited. Moreover, demand of the fireproof or flame retarding nonwoven products is constantly increasing such as industrial nonwoven, household decorating fabric and drapes, which are all required to have rather flame retarding capability so that they can avoid accidents. However, for those spunlaid nonwoven textile products employed polypropylene (PP), polyester (PET), polyethylene (PE) and Nylon as raw materials mentioned above, they all belong to indissoluble or un-biodegradable fiber. Therefore, their wastes are also indissoluble or un-biodegradable, which will incur substantially harmful burden to natural environment.

In view of these foregoing facts, how to produce expected eco-friendly and energy saving nonwoven from fossil-free feedstock of natural cellulose fibers, namely dissoluble fiber of biodegradability with long-acting flame retarding feature under preset process conditions becomes a critical and urgent demand.

SUMMARY OF THE INVENTION

The primary object is to provide a spunbond method for producing non-woven fabric of natural cellulose with flame-retarding feature comprising processing steps as below: initially, blend cellulose of wood pulp with solvent of N-methylmorpholine N-oxide (NMMO) to form into slurry, then evaporate extra water content from the prepared slurry by a Thin Film Evaporator (TFE) so that a spinning dope is formed; subsequently by spunbond process, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into natural cellulose filaments by means of air gap, latterly draw the natural cellulose filaments by an airflow draw jet device or airflow draw stretcher to become natural filaments of fibrous strand, next the natural filaments of fibrous strand are orderly post treated by regeneration with coagulation, water rinsing, hydro-entangled needle punching and drying to form normal natural cellulose nonwoven fabrics; and finally, after soaking roll the normal natural cellulose nonwoven by flame retardant of N-hydroxymethyl-3-(dimethoxy-phosphate acyl) propyl amide, then orderly bake, alkaline clean, water rinse, dry and wind-up them to produce modified natural cellulose nonwoven fabrics of long-acting flame retarding feature in coil manner. Because of cross-linking reaction between foregoing flame retardant and natural cellulose nonwoven, the flame-retarding capability thereof treated by water rinse for 20 times not only remains almost the same as that of un-treated by water rinse but also meets requirements of testing standards in American ASTM D6413-1999 and ASTM D2863-1995. Moreover, the wastes thereof meet environmental protection requirements due to eco-friendly and biodegradable. Besides, the spunbond method of the present invention is energy saving due to the fossil-free feedstock, which is free from dependence upon the petrochemical industry, and fulfils all requirements for a green label without drawback of harmful effect to the environmental protection.

The other object of the present invention is to provide a spunbond method for producing non-woven fabric of natural cellulose with flame-retarding feature with a solvent recycling process of N-methylmorpholine N-oxide (NMMO) comprising processing steps of bleaching, filtrating, condensing and refining by simple and effective processing facilities so that aquatic solution processed can be recycled into solvent of N-methylmorpholine N-oxide (NMMO) with quality almost being the same as that of fresh solvent, wherein the consumption rate is controlled down to less of 0.5% while total recycling rate reaches over 99.5%. Thereby, the present invention is not only free from the environment pollution but also able to reduce the solvent recycling cost so that it has effects in eco-friendly production and resource recycling economy.

DETAILED DESCRIPTION OF THE PREFERRED EMBODIMENTS

Figure 2:
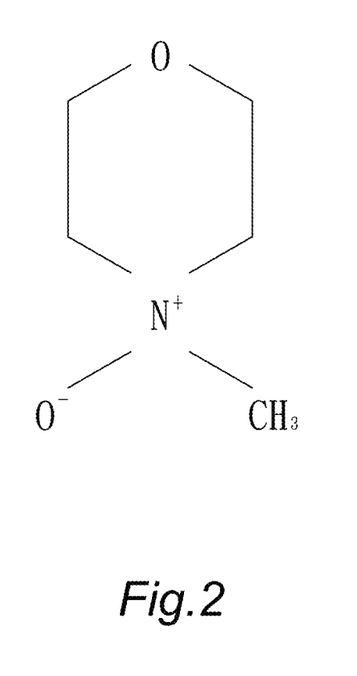
FIG. 2 is a chemical structure of the N-methylmorpholine N-oxide (NMMO) used in the present invention.
Figure 3:
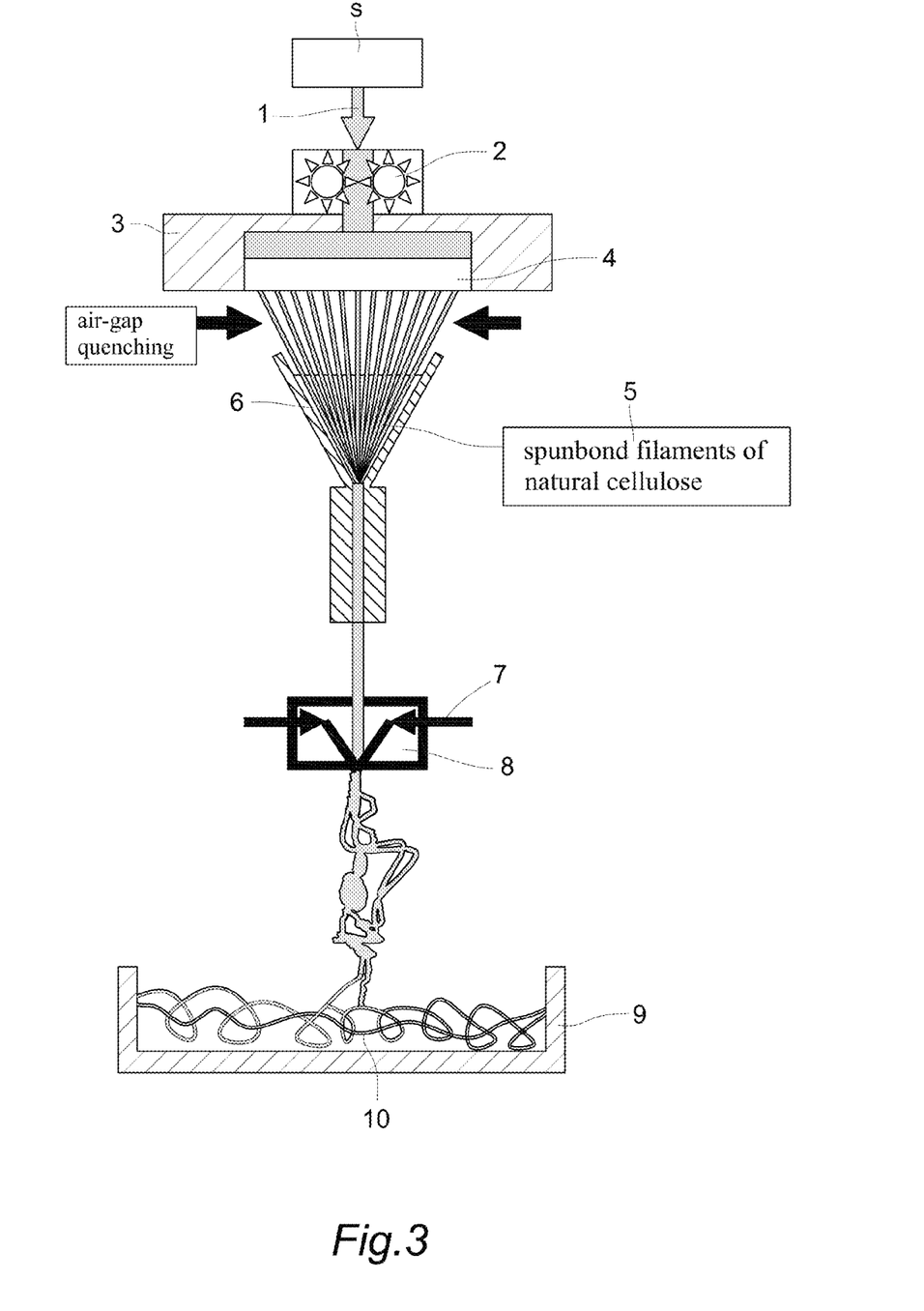
FIG. 3 is an operational view for a spunbond filament strand of natural cellulose in the present invention.
Figure 4:
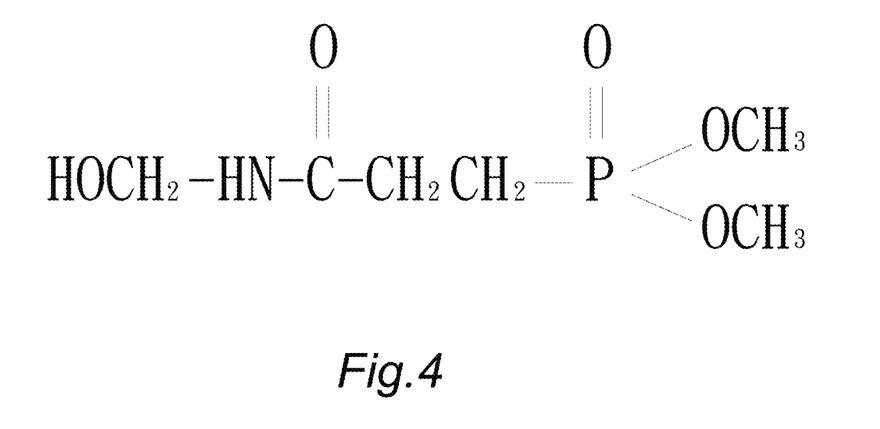
FIG. 4 is a chemical structure of the flame retardant of N-hydroxymethyl-3-(dimethoxy-phosphate acyl) propyl amide used in the present invention.

For further manifesting procedures in fabricating the present invention, some exemplary preferred embodiments are described below with associated drawing figures. Please refer to FIGS. 1 through 4. The Spunbond method for producing non-woven fabric of natural cellulose with flame-retarding feature comprises following process steps:

a. Prepare pulp of soft wood pulp or hard wood pulp as raw material with content cellulose over 65% and degree of polymerization (DP) in range of 450-1050;

b. Blend and dissolve pulp: by putting N-methylmorpholine N-oxide (NMMO) as dissolving solvent into prepared pulp for dissolving it into slurry, and high speed blending under low temperature in range of 50-80 degrees centigrade (50-80° C.) by horizontal blending machine, wherein the concentration of the N-methylmorpholine N-oxide (NMMO) is in percentage range of 45-78% with chemical structure thereof as shown in FIG. 2;

c. Evaporate extra water content from the prepared slurry by a Thin Film Vacuum Evaporator (TFE) under temperature in range of 80-120 degrees centigrade (80-120° C.) to heat for 10 minutes for decreasing water content thereof down to 5-13% so that a homogenized mucilaginous dope 1 is formed;

d. Via spunbond method, the dope 1 is firstly fed into and extruded out of an extruder, henceforth the dope 1 is fed into a spin-pack 3 and forcedly spun out of spin nozzles (or spinnerets, spin head) 4 by means of a gear pump 2 as shown in FIG. 3, afterward external compressed quenching air is continuously blown through for cooling and preliminarily drawing the dope 1 for converting it into natural cellulose filaments by means of air gap, latterly draw the natural cellulose filaments by an airflow draw jet device or airflow draw stretcher to become natural filaments of fibrous strand 5, wherein the ranges for distance of the air gap, temperature and relative humidity of the quenching air are 0.5-30 cm, 5-35 degrees centigrade (5-35° C.) and 60-99% respectively;

e. Coagulate and regenerate the natural filaments of fibrous strand 5 in a coagulating liquid 6, next draw the natural filaments of fibrous strand 5 by an airflow draw jet device (or airflow draw stretcher) 8 with drawing speed thereof in range of 20-3000 m/min to become uniform fine natural cellulose filaments, then bond and lay these natural filaments of fibrous strand 5 on a belt collector 9 to form a webbed nonwoven 10, wherein the ranges for temperature of the coagulating liquid 6 and concentration for existing N-methylmorpholine N-oxide (NMMO) of dissolving solvent are 5-30 degrees centigrade (5-30° C.) and 0-30 wt % respectively;

f. after post treatments of water rinsing, hydro-entangled needle punching and drying have been orderly applied, then a normal nonwoven fabric of natural cellulose is produced from the webbed nonwoven 10;

g. Soaking roll the normal natural cellulose nonwoven by flame retardant of N-hydroxymethyl-3-(dimethoxy-phosphate acyl) propyl amide with concentration thereof is in range of 200-500 grams per liter (g/L) with chemical structure thereof as shown in FIG. 4; and h. Orderly bake, alkaline clean, water rinse and dry, then wind-up (coil) the soaking rolled normal natural cellulose nonwoven to produce modified natural cellulose nonwoven of long-acting flame retarding feature, wherein the bake is performed under temperature in range of 130-180 degree centigrade (130-180° C.) with baking time in range of 120-240 seconds, the alkaline clean is performed in an alkaline solution of sodium hydroxide (NaOH) or sodium carbonate (Na.sub.2.CO.sub.3. or $Na_2CO_3$) with concentration of 50 grams per liter (g/L); and the coiling speed is in range of 2-200 meters per minute.

Wherein, for the dope 1 in above step c, the content percentage of cellulose thereof is in range of 6-15 wt %, the viscosity thereof is in range of 1000-20000 poise, the light permeability index thereof is in range of 1.470-1.495, and the melting Index thereof is in range of 200-1000.

Moreover, for the modified natural cellulose nonwoven produced from spunbond process in above step g, the basis weight thereof is in range of 10-300 grams per meter.sup.2. ($g/m^2$), the fineness of fiber thereof is in range of 1-50 μm, the tensile strength in mechanical direction (MD) thereof is in range of 5-20 kgf while the tensile strength in cross direction (CD) thereof is in range of 5-15 kgf.

For the foregoing step e, the ranges in concentration of existing N-methylmorpholine N-oxide (NMMO) in the coagulating liquid and the temperature thereof are 0-30 wt % and 5-35 degree centigrade (5-35° C.) respectively.

Figure 1:
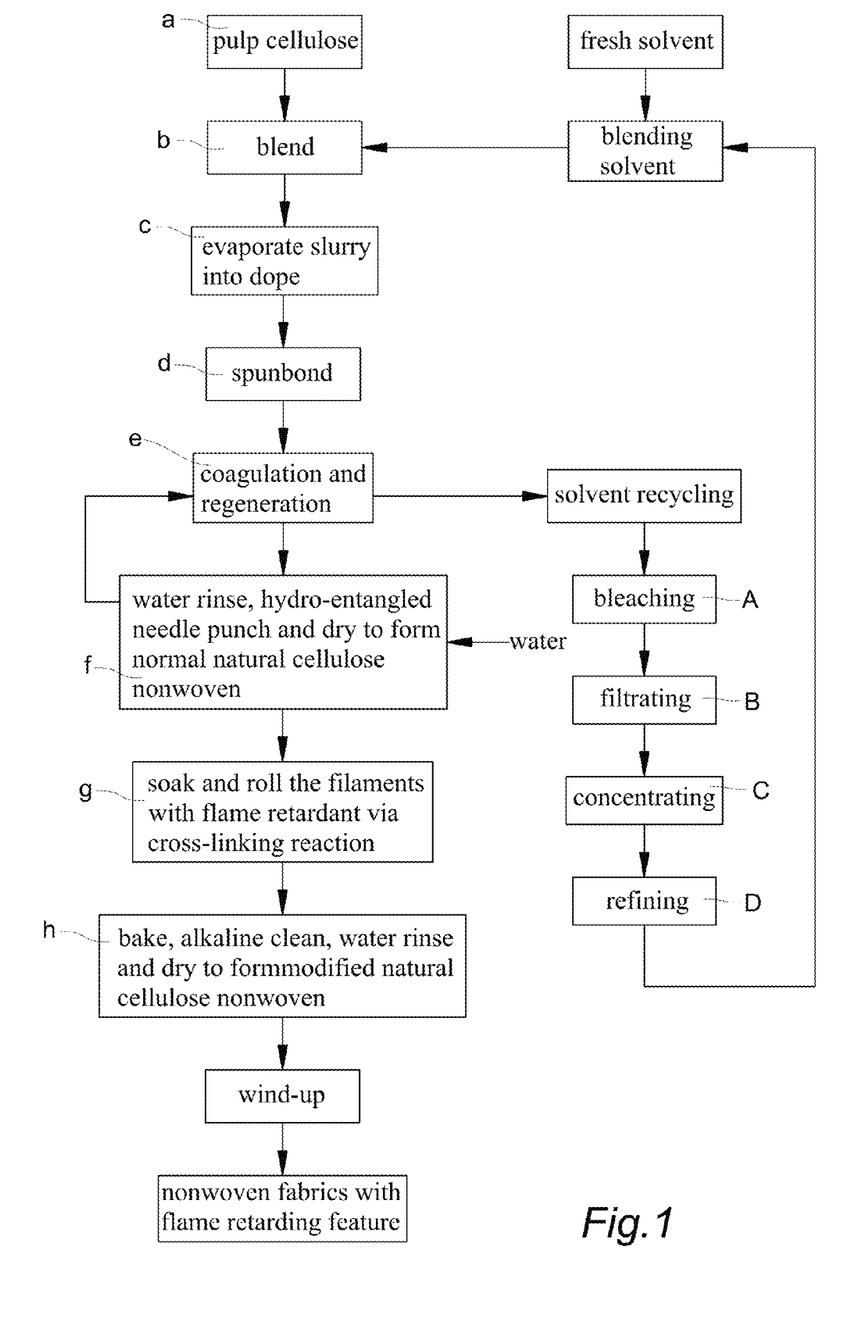
FIG. 1 is a flow chart showing fabricating process of the present invention.

Besides, the key solvent of N-methylmorpholine N-oxide (NMMO) used in the present invention will be released out during processes of the regenerating and water-rinsing of step f in great quantity, which should be collected for recycling so as to amply reuse in recurring manner as the recovery rate will significantly affect the integral process cost. As shown in FIG. 1, the solvent recycling process of N-methylmorpholine N-oxide (NMMO) comprises following steps:

A. Bleaching:

The bleaching process of the present invention is performed by absorption of suspending active carbon with practical steps as below: put active carbon powder with good absorptivity and suspension ability in percentage range of 0.05-0.10% into the liquid of N-methylmorpholine N-oxide (NMMO) solvent to be de-colored, then alternate the air-blast mixing with absorption and the stationary suspending absorption treatments with treating time ratio in range between 1:3 to 1:6 for over 8 hours to finish the bleaching procedure so that the advantages of the decolorizing process of the present invention have effects in simplifying process facilities, saving energy and enhancing effect of absorbing decolorization.

B. Filtrating:

The filtrating process of the present invention is performed by bi-phase filtration of coarse filtering phase and fine filtering phase. First coarse filtering phase: for simplifying the processing facility, general cartridge filter is used with filter aid composing of diatomite and cellulose preferably made of diatomite to cellulose in ratio of 4:1. In order to avoid hindering filtrating speed incurred by active carbon from gradually accumulating on the surface of the filtering cartridge, a filter aid not only spreads over the surface of the filtering cartridge but also is put in the solution to be filtrated with content thereof in percentage range between 0.03-0.05%. Besides, minor puffing agent is also mixed therein to enhance filtrating speed without degeneracy. After completion of the coarse filtering phase, the filtering dregs and the residual liquid are centrifugal and dehydrating treated for recycling use so that the residual auxiliary filtering agent of dehydrated filter aid can be reused as auxiliary filtering effect being remained. Second fine filtering phase: Ultrafiltration (UF) filter is used so that the cleanness of the filtrated liquid is the same as that of the fresh solvent. The advantages of the bi-phase filtrating process of the present invention are low cost of process facilities, low ratio of consumption rate, high throughput and high cleanness.

C. Concentrating:

In recovering the water rinsing liquid in the present invention, the condensing load in dehydration is very large in manner of approximately 90 tons per ton of fiber as solvent concentration must be condensed from in percentage range between 6.5-8.0% down to in percentage range between 50-55%. For low yield quantity of fiber, a tri-effect condensing method is adopted to dehydrate per ton of rinsing liquid in using 0.5 ton of steam (high steam consumption but low electric power consumption) while for high yield quantity of fiber, a Mechanical Vapor Recompression (MVR) condensing method is adopted to dehydrate per ton of rinsing liquid in using quantity range between 0.003-0.03 ton of steam (low steam consumption but high electric power consumption). The yield condensed liquid with solvent and condensed water in both foregoing condensing methods can also be completely recovered for reusing though each condensing method is only suitable for different specific yield quantity of fiber. Wherein, the yield condensed liquid with solvent can be recycled for reusing as processing solvent and yield condensed water can be recycled for reusing to rinse fiber.

D. Refining:

Adopting temperature at 80 degree centigrade (80° C.) low temperature oxidation and neutralizing reduction. Using percentage concentration in 35% of hydrogen peroxide ($H_2O_2$ or $H_2O_2$) as oxidant and percentage concentration in 85% of hydrazine hydrate ($N_2H_4H_2O$ or $N_2H_4H_2O$) as neutralizing reductant; the result is measured by electric potential titrating method. The NMMO content can be decreased down below 10 ppm so that not only the purity of NMMO can be promoted but also the NMMO consumption can be decreased.

For expedite you to further understand the features and efficacy of the present invention, various item tests for the exemplary embodiments are described in detail as below.

Embodiment 1: (Specimens in Number S1-S6 and F1-F6)

Initially, blend cellulose of wood pulp in degree of polymerization (DP) of 650 with solvent of N-methylmorpholine N-oxide (NMMO) to form into slurry, then evaporate extra water content from the prepared slurry by a Thin Film Evaporator (TFE) under temperature in range of 80-120 degree centigrade (80-120° C.) heating for 5 minutes to remove extra water content so that a spinning dope is formed with water percentage content in range between 5-13%; subsequently by spunbond process, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into natural cellulose filaments by means of air gap, latterly draw the natural cellulose filaments by an airflow draw jet device or airflow draw stretcher to become natural filaments of fibrous strand, next the natural filaments of fibrous strand are orderly post treated by regeneration with coagulation, water rinsing, hydro-entangled needle punching and drying to form normal natural cellulose nonwoven fabrics; and finally, after soaking roll the normal natural cellulose nonwoven by flame retardant of N-hydroxymethyl-3-(dimethoxy-phosphate acyl) propyl amide with concentration thereof in range of 0-450 g/L, then orderly bake under temperature of 180 degree centigrade (180° C.) heating for 4 minutes, alkaline clean, water rinse, dry and wind-up them to produce modified natural cellulose nonwoven fabrics of long-acting flame retarding feature in coil manner. For physical properties in specimens of the modified natural cellulose nonwovens produced are indicated by specimen number F1-F6 shown in Table-2 while the composition table of dope for different specimens indicated S1-S6 is shown in Table-1.

Embodiment 2: (Specimens in Number S7-S12 and F7-F12)

Initially, blend cellulose of wood pulp in degree of polymerization (DP) of 1050 with solvent of N-methylmorpholine N-oxide (NMMO) to form into slurry, then evaporate extra water content from the prepared slurry by a Thin Film Evaporator (TFE) under temperature in range of 80-120 degree centigrade (80-120° C.) heating for 5 minutes to remove extra water content so that a spinning dope is formed with water percentage content in range between 5-13%; subsequently by spunbond process, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into natural cellulose filaments by means of air gap, latterly draw the natural cellulose filaments by an airflow draw jet device or airflow draw stretcher to become natural filaments of fibrous strand, next the natural filaments of fibrous strand are orderly post treated by regeneration with coagulation, water rinsing, hydro-entangled needle punching and drying to form normal natural cellulose nonwoven fabrics; and finally, after soaking roll the normal natural cellulose nonwoven by flame retardant of N-hydroxymethyl-3-(dimethoxy-phosphate acyl) propyl amide with concentration thereof in range of 0-450 g/L, then orderly bake under temperature of 180 degree centigrade (180° C.) heating for 4 minutes, alkaline clean, water rinse, dry and wind-up them to produce modified natural cellulose nonwoven fabrics of long-acting flame retarding feature in coil manner. For physical properties in specimens of the modified natural cellulose nonwovens produced are indicated by specimen number F7-F12 shown in Table-2 while the composition table of dope for different specimens indicated S7-S12 is shown in Table-1.

TABLE 1

Constituents for dope of different sample composition

| NOS | DP | CC | SC | WC | DV | IPT | IXM |
|-----|------|------|------|-----|------|-------|-----|
| Embodiment 1: (specimens in number S1-S6) | | | | | | | |
| S1 | 650 | 11.5 | 80.1 | 8.4 | 4840 | 1.486 | 470 |
| S2 | 650 | 12.3 | 80.5 | 7.2 | 4980 | 1.479 | 420 |
| S3 | 650 | 13.0 | 80.1 | 6.9 | 4240 | 1.483 | 410 |
| S4 | 650 | 12.2 | 80.9 | 6.9 | 4060 | 1.478 | 420 |
| S5 | 650 | 12.0 | 80.6 | 7.4 | 4960 | 1.482 | 430 |
| S6 | 650 | 12.1 | 80.7 | 7.2 | 5210 | 1.484 | 405 |
| Embodiment 2: (specimens in number S7-S12) | | | | | | | |
| S7 | 1050 | 12.5 | 80.7 | 6.8 | 7240 | 1.479 | 250 |
| S8 | 1050 | 12.6 | 80.0 | 7.4 | 7560 | 1.478 | 200 |

TABLE 1-continued

Constituents for dope of different sample composition

| NOS | DP | CC | SC | WC | DV | IPT | IXM |
|---|---|---|---|---|---|---|---|
| S9  | 1050 | 13.0 | 81.0 | 6.0 | 8420 | 1.480 | 190 |
| S10 | 1050 | 12.3 | 80.9 | 6.8 | 8480 | 1.474 | 220 |
| S11 | 1050 | 12.7 | 80.2 | 7.1 | 8320 | 1.477 | 200 |
| S12 | 1050 | 12.9 | 80.4 | 6.7 | 9510 | 1.485 | 190 |

Notation
NOS denote assigned numbers of specimens.
DP denotes to degree of polymerization for cellulose.
CC denotes to content of cellulose.
SC denotes to content of solvent.
WC denotes to content of water.
DV denotes to viscosity of dope.
IPT denotes to index of light permeability for dope.
IXM denotes to melting Index of dope.

TABLE 2

Physical properties of natural cellulose nonwoven treated by flame retardants of different concentration

| Specimen | DP | CFR (g/L) | BW (g/m$^2$) | TS-MD (kgf) | TS-CD (kgf) | FF (μm) |
|---|---|---|---|---|---|---|
| Embodiment 1: (specimens in number F1-F6) | | | | | | |
| F1 | 650 | 0   | 100 | 17.2 | 10.3 | 15.2 |
| F2 | 650 | 100 | 101 | 18.0 | 10.6 | 14.8 |
| F3 | 650 | 200 | 101 | 18.0 | 10.3 | 15.5 |
| F4 | 650 | 300 | 99  | 17.5 | 10.1 | 14.5 |
| F5 | 650 | 400 | 100 | 17.2 | 10.8 | 15.7 |
| F6 | 650 | 450 | 100 | 18.6 | 10.3 | 15.4 |
| Embodiment 2: (specimens in number F7-F12) | | | | | | |
| F7  | 1050 | 0   | 101 | 18.8 | 11.7 | 14.9 |
| F8  | 1050 | 100 | 100 | 18.3 | 12.0 | 14.8 |
| F9  | 1050 | 200 | 99  | 20.2 | 12.3 | 15.2 |
| F10 | 1050 | 300 | 99  | 20.3 | 13.6 | 14.9 |
| F11 | 1050 | 400 | 100 | 20.1 | 13.5 | 15.2 |
| F12 | 1050 | 450 | 101 | 20.4 | 13.7 | 15.3 |

Notation
DP denotes to degree of polymerization for cellulose.
CFR denotes to concentration of flame retardant.
BW denotes to basis weight of nonwoven.
TS-MD denotes to tensile strength in mechanical direction (MD) of nonwoven.
TS-CD denotes to tensile strength in cross direction (CD) of nonwoven.
FF denotes to fineness of fiber.

Embodiment 3: (Test for Flame Retarding Capability)

Initially, respectively blend cellulose of wood pulps in degree of polymerization (DP) of 650 and 1050 with solvent of N-methylmorpholine N-oxide (NMMO) to form into slurry, and high speed blending under low temperature in range of 50-80 degrees centigrade (50-80° C.) by horizontal blending machine, then evaporate extra water content from the prepared slurry by a Thin Film Evaporator (TFE) under temperature in range of 80-120 degree centigrade (80-120° C.) heating for 5 minutes to remove extra water content so that a spinning dope is formed with water percentage content in range between 5-13%; subsequently by spunbond process, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into natural cellulose filaments by means of air gap, latterly draw the natural cellulose filaments by an airflow draw jet device or airflow draw stretcher to become natural filaments of fibrous strand, next the natural filaments of fibrous strand are orderly post treated by regeneration with coagulation, water rinsing, hydro-entangled needle punching and drying to form normal natural cellulose nonwoven fabrics; and finally, after soaking roll the normal natural cellulose nonwoven by flame retardant of N-hydroxymethyl-3-(dimethoxy-phosphate acyl) propyl amide with concentration thereof in range of 0-450 g/L, then orderly bake under temperature of 180 degree centigrade (180° C.) heating for 4 minutes, alkaline clean, water rinse, dry and wind-up them to produce modified natural cellulose nonwoven fabrics of long-acting flame retarding feature in coil manner.

All related items of flame retarding capability for specimens of foregoing natural cellulose nonwovens produced are tested in accordance with American ASTM D6413-1999 testing standards. A vertical burning method, which is adopted for the test of flame retarding capability, comprises following steps. Firstly, respectively weave each specimen of all F1-F12 nonwoven specimens into three pieces of sample such that each piece of sample is dimensioned in 1.5 cm×24.5 cm, secondly, fix each piece of sample on a fireproof test apparatus such that the distance between the lower end of each piece of sample and burner mouth of the fireproof test apparatus is 19 mm, thirdly, adjust burner flame of the fireproof test apparatus at height of 38 mm to perform test of flame retarding capability for 12 seconds, fourthly, remove away the burner flame of the fireproof test apparatus and meanwhile press the start button of a stopwatch for starting time count, fifthly, upon all remaining ash on the testing sample is completely extinguished, press the stop button of the stopwatch for stopping time count, and finally, record each continual time of remaining flame and each time of remaining ash. The measurement in distance of carbonization comprises following steps: remove away each piece of sample from the fireproof test apparatus after having finished foregoing test of flame retarding capability, next fold each piece of sample and press down at one lower side of the folded sample a hammer-like weight with area thereof corresponding to that of the folded sample, then hold the other lower side of the folded sample and turn it upside down, and test disconnecting distance for each piece of sample. All testing results obtained in foregoing various tests for specimens are shown in Table-3 with specimen number of F1-F12 indicated and Table-4 with specimen number of T1-T12 indicated.

TABLE 3

Embodiment 3: (specimens in number F1-F12)
Flame retarding test of natural cellulose nonwoven treated by different concentration of flame retardants but under same baking temperature at 180 degree centigrade (180° C.) and same baking time of 240 seconds

| Specimen | DP | CFR (g/L) | TRF (second) | TRA (second) | DC (mm) | TE (Yes/No) |
|---|---|---|---|---|---|---|
| F1  | 650  | 0   | >30 | >30 | >200 | No |
| F2  | 650  | 100 | >1  | >2  | >100 | No |
| F3  | 650  | 200 | 0   | 0.3 | 50   | slight |
| F4  | 650  | 300 | 0   | 0.1 | 47   | Yes |
| F5  | 650  | 400 | 0   | 0   | 45   | Yes |
| F6  | 650  | 450 | 0   | 0   | 42   | Yes |
| F7  | 1050 | 0   | >30 | >30 | >200 | No |
| F8  | 1050 | 100 | >1  | >2  | >100 | No |
| F9  | 1050 | 200 | 0   | 0.3 | 50   | slight |
| F10 | 1050 | 300 | 0   | 0.1 | 45   | Yes |
| F11 | 1050 | 400 | 0   | 0   | 43   | Yes |
| F12 | 1050 | 450 | 0   | 0   | 41   | Yes |

Notation
DP denotes to degree of polymerization for cellulose.

TABLE 3-continued

Embodiment 3: (specimens in number F1-F12)
Flame retarding test of natural cellulose nonwoven treated
by different concentration of flame retardants but under
same baking temperature at 180 degree centigrade (180° C.)
and same baking time of 240 seconds

| Specimen | DP | CFR (g/L) | TRF (second) | TRA (second) | DC (mm) | TE (Yes/No) |
|---|---|---|---|---|---|---|

CFR denotes to concentration of flame retardant.
TRF denotes to time of remaining flame.
TRA denotes to time of remaining ash.
DC denotes to distance of carbonization for fiber.
TE denotes to effect of test.

TABLE 4

Embodiment 4: (specimens in number T1-T12)
Flame retarding test of natural cellulose nonwoven treated by
same concentration in 450 g/L of flame retardants but under
different baking temperature and different baking time

| specimen | DP | BTE (° C.) | BTM (sec.) | TRF (sec.) | TRA (sec.) | DC (mm) | TE (Yes/No) |
|---|---|---|---|---|---|---|---|
| T1 | 650 | 140 | 240 | >1 | >2 | >100 | No |
| T2 | 650 | 160 | 240 | 0 | >1 | >75 | slight |
| T3 | 650 | 180 | 120 | 0 | 0.5 | 55 | Yes |
| T4 | 650 | 180 | 160 | 0 | 0.2 | 46 | Yes |
| T5 | 650 | 180 | 200 | 0 | 0 | 44 | Yes |
| T6 | 650 | 180 | 240 | 0 | 0 | 42 | Yes |
| T7 | 1050 | 140 | 240 | >1 | >2 | >100 | No |
| T8 | 1050 | 160 | 240 | 0 | >1 | >75 | slight |
| T9 | 1050 | 180 | 120 | 0 | 0.5 | 56 | Yes |
| T10 | 1050 | 180 | 160 | 0 | 0.2 | 45 | Yes |
| T11 | 1050 | 180 | 200 | 0 | 0 | 44 | Yes |
| T12 | 1050 | 180 | 240 | 0 | 0 | 41 | Yes |

Notation
DP denotes to degree of polymerization for cellulose.
BTE denotes to baking temperature.
BTM denotes to baking time.
TRF denotes to time of remaining flame.
TRA denotes to) time of remaining ash.
DC denotes to distance of carbonization for fiber.
TE denotes to effect of test.

Embodiment 4: (Test for Flame Retarding Capability at Limit of Oxygen Index (L.O.I))

Initially, respectively blend cellulose of wood pulps in degree of polymerization (DP) of 650 and 1050 with solvent of N-methylmorpholine N-oxide (NMMO) to form into slurry, and high speed blending under low temperature in range of 50-80 degrees centigrade (50-80° C.) by horizontal blending machine, then evaporate extra water content from the prepared slurry by a Thin Film Evaporator (TFE) under temperature in range of 80-120 degree centigrade (80-120° C.) heating for 5 minutes to remove extra water content so that a spinning dope is formed with water percentage content in range between 5-13%; subsequently by spunbond process, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into natural cellulose filaments by means of air gap, latterly draw the natural cellulose filaments by an airflow draw jet device or airflow draw stretcher to become natural filaments of fibrous strand, next the natural filaments of fibrous strand are orderly post treated by regeneration with coagulation, water rinsing, hydro-entangled needle punching and drying to form normal natural cellulose nonwoven fabrics; and finally, after soaking roll the normal natural cellulose nonwoven by flame retardant of N-hydroxymethyl-3-(dimethoxy-phosphate acyl) propyl amide, then orderly bake, alkaline clean, water rinse, dry and wind-up them to produce modified natural cellulose nonwoven fabrics of long-acting flame retarding feature in coil manner. All related items of flame retarding capability at Limit of Oxygen Index (L.O.I) for specimens of foregoing natural cellulose nonwovens produced are tested in accordance with American ASTM D2863-1995 testing standards.

The value of the Limit of Oxygen Index (L.O.I) is defined as minimal oxygen concentration required for keeping testing specimen of fiber or fabric in sustainable burning in a burning cylinder. The calculating formula thereof is expressed as below.

$$LOI = \frac{O_2}{O_2 + N_2} \times 100\%$$

The higher value of the Limit of Oxygen Index (L.O.I) means higher oxygen concentration is required for keeping testing specimen of fiber or fabric in sustainable burning in a burning cylinder. In other words, the testing specimen is more difficult to burn. All testing results obtained in foregoing various tests for specimens are shown in Table-5 with specimen number of F1-F12 indicated and Table-6 with specimen number of T1-T12 indicated.

TABLE 5

Embodiment 4 (specimens in number F1-F12)
Flame retarding test of natural cellulose nonwoven treated by
different concentration of flame retardants and different Limits
of Oxygen Index (L.O.I) but under same baking temperature
at 180 degree centigrade (180° C.) and same baking
time of 240 seconds.

| Specimen | DP | CFR (g/L) | L.O.I | TE (Yes/No) |
|---|---|---|---|---|
| F1 | 650 | 0 | 17 | No |
| F2 | 650 | 100 | 23 | No |
| F3 | 650 | 200 | 27 | slight |
| F4 | 650 | 300 | 30 | Yes |
| F5 | 650 | 400 | 35 | Yes |
| F6 | 650 | 450 | 37 | Yes |
| F7 | 1050 | 0 | 17 | No |
| F8 | 1050 | 100 | 24 | No |
| F9 | 1050 | 200 | 27 | slight |
| F10 | 1050 | 300 | 33 | Yes |
| F11 | 1050 | 400 | 36 | Yes |
| F12 | 1050 | 450 | 37 | Yes |

Notation
DP denotes to degree of polymerization for cellulose.
CFR denotes to concentration of flame retardant.
L.O.I denotes to limit of oxygen index (L.O.I).
TE denotes to effect of test.

TABLE 6

Embodiment 4: (specimens in number T1-T12)
Flame retarding test of natural cellulose nonwoven treated
by same concentration in 450 g/L of flame retardants but
different Limit of Oxygen Index (L.O.I) and under different
baking temperature and different baking time.

| Specimen | DP | BTE (° C.) | BTM (second) | L.O.I | TE (Yes/No) |
|---|---|---|---|---|---|
| T1 | 650 | 140 | 240 | 21 | No |
| T2 | 650 | 160 | 240 | 23 | slight |
| T3 | 650 | 180 | 120 | 26 | slight |

TABLE 6-continued

Embodiment 4: (specimens in number T1-T12)
Flame retarding test of natural cellulose nonwoven treated
by same concentration in 450 g/L of flame retardants but
different Limit of Oxygen Index (L.O.I) and under different
baking temperature and different baking time.

| Specimen | DP | BTE (° C.) | BTM (second) | L.O.I | TE (Yes/No) |
|---|---|---|---|---|---|
| T4 | 650 | 180 | 160 | 28 | Yes |
| T5 | 650 | 180 | 200 | 31 | Yes |
| T6 | 650 | 180 | 240 | 37 | Yes |
| T7 | 1050 | 140 | 240 | 21 | No |
| T8 | 1050 | 160 | 240 | 23 | slight |
| T9 | 1050 | 180 | 120 | 26 | slight |
| T10 | 1050 | 180 | 160 | 29 | Yes |
| T11 | 1050 | 180 | 200 | 34 | Yes |
| T12 | 1050 | 180 | 240 | 37 | Yes |

Notation
DP denotes to degree of polymerization for cellulose.
BTE denotes to baking temperature.
BTM denotes to baking time.
L.O.I denotes to limit of oxygen index (L.O.I).
DC denotes to distance of carbonization for fiber.
TE denotes to effect of test.

Embodiment 5: (Test for Flame Retarding Capability after Water Rinsing for 20 Times)

Initially, respectively blend cellulose of wood pulps in degree of polymerization (DP) of 650 and 1050 with solvent of N-methylmorpholine N-oxide (NMMO) to form into slurry, and high speed blending under low temperature in range of 50-80 degrees centigrade (50-80° C.) by horizontal blending machine, then evaporate extra water content from the prepared slurry by a Thin Film Evaporator (TFE) under temperature in range of 80-120 degree centigrade (80-120° C.) heating for 5 minutes to remove extra water content so that a spinning dope is formed with water percentage content in range between 5-13%; subsequently by spunbond process, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into natural cellulose filaments by means of air gap, latterly draw the natural cellulose filaments by an airflow draw jet device or airflow draw stretcher to become natural filaments of fibrous strand, next the natural filaments of fibrous strand are orderly post treated by regeneration with coagulation, water rinsing, hydro-entangled needle punching and drying to form normal natural cellulose nonwoven fabrics; and finally, after soaking roll the normal natural cellulose nonwoven by flame retardant of N-hydroxymethyl-3-(dimethoxy-phosphate acyl) propyl amide, then orderly bake, alkaline clean, water rinse, dry and wind-up them to produce modified natural cellulose nonwoven fabrics of long-acting flame retarding feature in coil manner. For specimens of foregoing natural cellulose nonwovens produced, they have to be firstly water rinsed for 20 times in accordance with AATCC 135-2004 Option 1 (2)v1 A(i) 4 Lb Load water rinsing method, then all related items of flame retarding capability thereof are tested in accordance with American ASTM D6413-1999 testing standards. All testing results obtained in foregoing various tests for specimens are shown in Table-7 with specimen number of F1-F12 indicated and Table-8 with specimen number of T1-T12 indicated.

TABLE 7

Embodiment 5: (specimens in number F1-F12)
Flame retarding test of natural cellulose nonwoven treated by
different concentration of flame retardants but under same
baking temperature at 180 degree centigrade (180° C.) and
same baking time of 240 seconds then water rinsed for 20 times.

| Specimen | DP | CFR (g/L) | TRF (sec.) | TRA (sec.) | DC (mm) | TE (Yes/No) |
|---|---|---|---|---|---|---|
| F1 | 650 | 0 | >30 | >30 | >200 | No |
| F2 | 650 | 100 | >1 | >2 | >100 | No |
| F3 | 650 | 200 | 0 | 0.3 | 55 | slight |
| F4 | 650 | 300 | 0 | 0.1 | 48 | Yes |
| F5 | 650 | 400 | 0 | 0 | 46 | Yes |
| F6 | 650 | 450 | 0 | 0 | 44 | Yes |
| F7 | 1050 | 0 | >30 | >30 | >200 | No |
| F8 | 1050 | 100 | >1 | >2 | >100 | No |
| F9 | 1050 | 200 | 0 | 0.3 | 51 | slight |
| F10 | 1050 | 300 | 0 | 0.1 | 48 | Yes |
| F11 | 1050 | 400 | 0 | 0 | 47 | Yes |
| F12 | 1050 | 450 | 0 | 0 | 44 | Yes |

Notation
DP denotes to degree of polymerization for cellulose.
CFR denotes to concentration of flame retardant.
TRF denotes to time of remaining flame.
TRA denotes to time of remaining ash.
DC denotes to distance of carbonization for fiber.
TE denotes to effect of test.

TABLE 8

Embodiment 5: (specimens in number T1-T12)
Flame retarding test of natural cellulose nonwoven treated by
same concentration in 450 g/L of flame retardants but under
different baking temperature and different baking time
then water rinsed for 20 times.

| Specimen | DP | BTE (° C.) | BTM (sec) | TRF (sec) | TRA (sec) | DC (mm) | TE (Yes/No) |
|---|---|---|---|---|---|---|---|
| T1 | 650 | 140 | 240 | >5 | >10 | >150 | No |
| T2 | 650 | 160 | 240 | >1 | >2 | >100 | No |
| T3 | 650 | 180 | 120 | 0 | 0.5 | 55 | slight |
| T4 | 650 | 180 | 160 | 0 | 0.2 | 50 | Yes |
| T5 | 650 | 180 | 200 | 0 | 0 | 47 | Yes |
| T6 | 650 | 180 | 240 | 0 | 0 | 44 | Yes |
| T7 | 1050 | 140 | 240 | >5 | >10 | >150 | No |
| T8 | 1050 | 160 | 240 | >1 | >2 | >100 | No |
| T9 | 1050 | 180 | 120 | 0 | 0.5 | 52 | slight |
| T10 | 1050 | 180 | 160 | 0 | 0.2 | 48 | Yes |
| T11 | 1050 | 180 | 200 | 0 | 0 | 45 | Yes |
| T12 | 1050 | 180 | 240 | 0 | 0 | 44 | Yes |

Notation
DP denotes to degree of polymerization for cellulose.
BTE denotes to baking temperature.
BTM denotes to baking time.
TRF denotes to time of remaining flame.
TRA denotes to time of remaining ash.
DC denotes to distance of carbonization for fiber.
TE denotes to effect of test.

Embodiment 6: (Test for Flame Retarding Capability at Limit of Oxygen Index (L.O.I) after Water Rinsing for 20 Times)

Initially, respectively blend cellulose of wood pulps in degree of polymerization (DP) of 650 and 1050 with solvent of N-methylmorpholine N-oxide (NMMO) to form into slurry, and high speed blending under low temperature in range of 50-80 degrees centigrade (50-80° C.) by horizontal blending machine, then evaporate extra water content from the prepared slurry by a Thin Film Evaporator (TFE) under temperature in range of 80-120 degree centigrade (80-120° C.) heating for 5 minutes to remove extra water content so that a spinning dope is formed with water percentage content in range between 5-13%; subsequently by spunbond process, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into natural cellulose filaments by means of air gap, latterly draw the natural cellulose filaments by an airflow draw jet device or airflow draw stretcher to become natural filaments of fibrous strand, next the natural filaments of fibrous strand are orderly post treated by regeneration with coagulation, water rinsing, hydro-entangled needle punching and drying to form normal natural cellulose nonwoven fabrics; and finally, after soaking roll the normal natural cellulose nonwoven by flame retardant of N-hydroxymethyl-3-(dimethoxy-phosphate acyl) propyl amide, then orderly bake, alkaline clean, water rinse, dry and wind-up them to produce modified natural cellulose nonwoven fabrics of long-acting flame retarding feature in coil manner. For specimens of foregoing natural cellulose nonwovens produced, they have to be firstly water rinsed for 20 times in accordance with AATCC 135-2004 Option 1 (2)v1 A(i) 4 Lb Load water rinsing method, then all related items of flame retarding capability at Limit of Oxygen Index (L.O.I) thereof are tested in accordance with American ASTM D2863-1995 testing standards. All testing results obtained in foregoing various tests for specimens are shown in Table-9 with specimen number of F1-F12 indicated and Table-10 with specimen number of T1-T12 indicated.

TABLE 9

Embodiment 6: (specimens in number F1-F12)
Flame retarding test of natural cellulose nonwoven treated by different concentration of flame retardants and different Limit of Oxygen Index (L.O.I) after 20 times of water rinsing but under same baking temperature at 180 degree centigrade (180° C.) and same baking time of 240 seconds.

| Specimen | DP | CFR (g/L) | WR-L.O.I | TE (Yes/No) |
|---|---|---|---|---|
| F1 | 650 | 0 | 15 | No |
| F2 | 650 | 100 | 22 | No |
| F3 | 650 | 200 | 26 | slight |
| F4 | 650 | 300 | 32 | Yes |
| F5 | 650 | 400 | 35 | Yes |
| F6 | 650 | 450 | 36 | Yes |
| F7 | 1050 | 0 | 15 | No |
| F8 | 1050 | 100 | 20 | No |
| F9 | 1050 | 200 | 27 | slight |
| F10 | 1050 | 300 | 32 | Yes |
| F11 | 1050 | 400 | 35 | Yes |
| F12 | 1050 | 450 | 36 | Yes |

Notation
DP denotes to degree of polymerization for cellulose.
CFR denotes to concentration of flame retardant.
WR-L.O.I denotes to limit of oxygen index (L.O.I) after 20 times of water rinsing.
TE denotes to effect of test.

TABLE 10

Embodiment 6: (specimens in number T1-T12)
Flame retarding test of natural cellulose nonwoven treated by same concentration in 450 g/L of flame retardants but different Limit of Oxygen Index (L.O.I) after 20 times of water rinsing and under different baking temperature and different baking time.

| Specimen | DP | BTE (° C.) | BTM (second) | WR-L.O.I | TE (Yes/No) |
|---|---|---|---|---|---|
| T1 | 650 | 140 | 240 | 21 | No |
| T2 | 650 | 160 | 240 | 23 | slight |
| T3 | 650 | 180 | 120 | 26 | slight |
| T4 | 650 | 180 | 160 | 28 | Yes |
| T5 | 650 | 180 | 200 | 33 | Yes |
| T6 | 650 | 180 | 240 | 35 | Yes |
| T7 | 1050 | 140 | 240 | 21 | No |
| T8 | 1050 | 160 | 240 | 23 | slight |
| T9 | 1050 | 180 | 120 | 25 | slight |
| T10 | 1050 | 180 | 160 | 29 | Yes |
| T11 | 1050 | 180 | 200 | 34 | Yes |
| T12 | 1050 | 180 | 240 | 35 | Yes |

Notation
DP denotes to degree of polymerization for cellulose.
BTE denotes to baking temperature.
BTM denotes to baking time.
WR-L.O.I denotes to limit of oxygen index (L.O.I) after 50 times of water rinsing.
TE denotes to effect of test.

With all testing results obtained in foregoing flame retarding tests of natural cellulose nonwoven fabrics for all specimens shown in Tables 3 through 6, following facts can be realized for the natural cellulose nonwoven fabrics with flame-retarding capability of the present invention: When the content for flame retardant of N-(hydroxymethyl)-3-(methoxy phosphorus acyl exceeds 200 grams per liter (g/L), the value of related limit of oxygen index (L.O.I) can reach over 25, when the content for flame retardant of N-hydroxymethyl-3-(dimethoxy-phosphate acyl) propyl amide exceeds 350 grams per liter (g/L) to meet the requirements of American ASTM D6413-1999 and ASTM D2863-1995, the value of related limit of oxygen index (L.O.I) can reach over 32. Therefore, the associated embodiments of Tables 3 through 6 reflect that the present invention can really achieve well flame retarding effect.

Moreover, from all testing results obtained in foregoing flame retarding tests of natural cellulose nonwoven fabrics for all specimens after water rinsing for 20 times shown in Tables 7 through 10, the flame retarding capability for the nonwoven fabrics of the present invention not only can still maintain same original effect as that before water rinsing but also can meet the requirements of testing standards in American ASTM D6413-1999 and ASTM D2863-1995. Thus, it proves in self-explanatory manner that the flame-retarding capability for the long-acting natural cellulose nonwoven fabrics of the present invention substantially exceeds that of the conventional flame-retarding nonwoven fabrics in the general market, which is either coated flame retarding agent on the surface of nonwoven fabrics or mixed with conventional nonwoven fabrics therein.

In conclusion of the disclosure heretofore, because the cross-linking reaction for the flame retardant of N-hydroxymethyl-3-(dimethoxy-phosphate acyl) propyl amide with natural cellulose nonwoven fabrics during fabricating process, the flame-retarding capability for fabrics made from the natural cellulose nonwoven fabrics by the spunbond process of the present invention, even after water-rinsing for 20 times, can meet not only strict requirement in the quality control but also the requirements of testing standards in American ASTM D6413-1999 and ASTM D2863-1995. Besides, the present invention can produce natural cellulose nonwoven fabrics with flame retarding capability in various demanded specifications in accordance with different mixed proportion in the flame retardant of N-hydroxymethyl-3-(dimethoxy-phosphate acyl) propyl amide so that the decreasing rate of fiber strength is less than 10%. Moreover, the wastes of the natural cellulose nonwoven fabrics can be naturally biodegraded or decomposed to meet the requirements of environment protection so that it really has feature of industrial application, which meets basic criterion of the patentability. Accordingly, we submit the patent application in accordance with related patent laws.

What is claimed is:

1. A spunbond method for producing non-woven fabric of natural cellulose with flame-retarding feature comprises following process steps:
   a. preparing pulp of soft wood pulp or hard wood pulp as a raw material with content cellulose over 65% and degree of polymerization (DP) in range of 450-1050;
   b. blending and dissolving the pulp by putting N-methylmorpholine N-oxide (NMMO) as a dissolving solvent into the prepared pulp for dissolving it into a slurry, and high speed blending under low temperature in a range of 50-80 degrees centigrade (50-80° C.) by using a horizontal blending machine, wherein the concentration of the NMMO is in a percentage range of 45-78%;
   c. evaporating extra water content from the prepared slurry by using a Thin Film Vacuum Evaporator (TFE) under temperature in a range of 80-120 degrees centigrade (80-120° C.) and heated for 10 minutes for decreasing a water content thereof down to 5-13% so that a homogenized mucilaginous dope is formed;
   d. via a spunbond method, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into natural cellulose filaments by means of air gap, latterly drawing the natural cellulose filaments by using an airflow draw jet device or airflow draw stretcher to become natural filaments of fibrous strand, wherein the ranges for distance of the air gap, temperature and relative humidity of the quenching air are 0.5-30 cm, 5-35 degrees centigrade (5-35° C.) and 60-99% respectively;
   e. coagulating and regenerating the natural filaments of fibrous strand in a coagulating liquid, and drawing the natural filaments of fibrous strand by using an airflow draw jet device or airflow draw stretcher with drawing speed thereof in a range of 20-3000 m/min to form uniform fine natural cellulose filaments, then bonding and laying these natural filaments of fibrous strand on a belt collector to form a webbed nonwoven, wherein the ranges for temperature of the coagulating liquid and concentration for existing NMMO of dissolving solvent are 5-30 degrees centigrade (5-30° C.) and 0-30 wt % respectively;
   f. after post treatments of water rinsing, hydro-entangled needle punching and drying have been orderly applied, then a normal nonwoven fabric of natural cellulose is produced from the webbed nonwoven;
   g. soaking a roll of the normal natural cellulose nonwoven in a flame retardant of N-hydroxymethyl-3-(dimethoxy-phosphate acyl) propyl amide with concentration thereof in a range of 350-500 grams per liter (g/L); and
   h. orderly baking, alkaline cleaning, water rinsing and drying, then winding up the soaking rolled normal natural cellulose nonwoven to produce modified natural cellulose nonwoven of long-acting flame retarding feature, wherein the baking is performed under temperature of 180 degree centigrade (180° C.) with baking time in a range of 120-240 seconds, the alkaline cleaning is performed in an alkaline solution of sodium hydroxide (NaOH) with concentration of 50 grams per liter (g/L); and the coiling speed is in a range of 2-200 meters per minute,
   wherein the fineness of fiber for the modified natural cellulose nonwoven produced from spunbond process in step g is greater than 15 and less than 50 μm,
   wherein the basis weight for the modified natural cellulose nonwoven produced from spunbond process in step g is in range of 100-300 g/m$^2$, and
   wherein the modified natural cellulose nonwoven has a limit of oxygen index between 25 to 35 after 50 water rinsings.

2. The Spunbond method for producing non-woven fabric of natural cellulose with flame-retarding feature as claimed in claim 1, wherein the cellulose content of dope in step c is in range of 6-15 wt %.

3. The Spunbond method for producing non-woven fabric of natural cellulose with flame-retarding feature as claimed in claim 1, wherein the viscosity of dope in step c is in range of 1000-20000 poise.

4. The Spunbond method for producing non-woven fabric of natural cellulose with flame-retarding feature as claimed in claim 1, wherein the light permeability index of dope in step c is in range of 1.470-1.495.

5. The Spunbond method for producing non-woven fabric of natural cellulose with flame-retarding feature as claimed in claim 1, wherein the melting Index of dope in step c is in range of 200-1000.

6. The Spunbond method for producing non-woven fabric of natural cellulose with flame-retarding feature as claimed in claim 1, wherein for the modified natural cellulose nonwoven produced from spunbond process in step g is that the tensile strength in mechanical direction (MD) thereof is in range of 5-20 kgf while the tensile strength in cross direction (CD) thereof is in range of 5-15 kgf.

7. The Spunbond method for producing non-woven fabric of natural cellulose with flame-retarding feature as claimed in claim 1, wherein for the existing NMMO in the coagulating liquid in step e is in the concentration range of and temperature thereof are 0-30 wt % and 5-35 degree centigrade (5-35° C.) respectively.

8. The Spunbond method for producing non-woven fabric of natural cellulose with flame-retarding feature as claimed in claim 1, wherein the alkaline solution used in alkaline clean process in step h is replaced by sodium carbonate ($Na_2CO_3$) with concentration of 50 grams per liter (g/L).

9. The Spunbond method for producing non-woven fabric of natural cellulose with flame-retarding feature as claimed in claim 1, wherein the raw material pulp in step a is replaced by any of soft wood pulp or hard wood pulp so long as the content cellulose is over 65% and degree of polymerization (DP) is in range of 500-1500.

10. The Spunbond method for producing non-woven fabric of natural cellulose with flame-retarding feature as claimed in claim 1, wherein the solvent recycling process of the NMMO comprises following steps:
    A. bleaching by absorption of suspending active carbon, wherein said bleaching comprises putting active carbon powder in a percentage range of 0.05-0.10% into the liquid NMMO solvent to be de-colored, then alternating the air-blast mixing with absorption and the stationary suspending absorption treatments with a treating time ratio in a range between 1:3 to 1:6 for over 8 hours to finish the bleaching procedure;

B. filtrating by bi-phase filtration having a first coarse filtering phase and a second fine filtering phase: wherein in the first coarse filtering phase, a general cartridge filter is used with a filter aid composing of diatomite and cellulose, wherein the filter aid not only spreads over the surface of the cartridge filter but also is put in the solution to be filtrated with content thereof in a percentage range between 0.03-0.05%, a minor puffing agent is also mixed therein to enhance filtrating speed without degeneracy; and wherein after completion of the coarse filtering phase, filtering dregs and a residual liquid are centrifugal and dehydrating treated for recycling use so that a residual auxiliary filtering agent of dehydrated filter aid is reused as an auxiliary filtering; and wherein in the second fine filtering phase, an Ultrafiltration (UF) filter is used;

C. concentrating the solvent, wherein for low yield quantity of fiber, a tri-effect condensing method is adopted to dehydrate per ton of rinsing liquid in using 0.5 ton of steam with high steam consumption but low electric power consumption while, and for high yield quantity of fiber, a Mechanical Vapor Recompression (MVR) condensing method is adopted to dehydrate per ton of rinsing liquid in using quantity range between 0.003-0.03 ton of steam with low steam consumption but high electric power consumption so that the yield condensed liquid with solvent and condensed water in both foregoing condensing methods are completely recovered for reusing, wherein the yield condensed liquid with solvent is recycled for reusing as a processing solvent and yield condensed water is recycled for reusing to rinse the fiber; and D. redefining by adopting a temperature at 80 degree centigrade (80° C.) low temperature oxidation and neutralizing reduction by using a percentage concentration in 35% of hydrogen peroxide ($H_2O_2$) as an oxidant and a percentage concentration in 85% of hydrazine hydrate ($N_2H_4H_2O$) as a neutralizing reductant with result is measured by electric potential titrating method so that the NMMO content is decreased down below 10 ppm so that not only the purity of NMMO is promoted but also the NMMO consumption is decreased.

* * * * *